(12) United States Patent
Bostoen et al.

(10) Patent No.: US 7,702,008 B2
(45) Date of Patent: Apr. 20, 2010

(54) METHOD FOR DETERMING CROSSTALK COUPLING AND CROSSTALK DETERMINING UNIT FOR INTEGRATION IN DIGITAL DATA TRANSMISSION SYSTEMS

(75) Inventors: Tom Bostoen, Anterpen (BE); Geert Ysebaert, Winksele (BE)

(73) Assignee: Alcatel-Lucent, Paris (FR)

( * ) Notice: Subject to any disclaimer, the term of this patent is extended or adjusted under 35 U.S.C. 154(b) by 831 days.

(21) Appl. No.: 11/510,828

(22) Filed: Aug. 28, 2006

(65) Prior Publication Data
US 2007/0047631 A1 Mar. 1, 2007

(30) Foreign Application Priority Data
Aug. 29, 2005 (EP) ................... 05291798

(51) Int. Cl.
*H04B 3/46* (2006.01)
*H04L 25/00* (2006.01)
(52) U.S. Cl. ...................... 375/224; 375/257
(58) Field of Classification Search ............. 375/222, 375/223, 224, 227, 257; 324/628; 370/201; 439/941
See application file for complete search history.

(56) References Cited

U.S. PATENT DOCUMENTS

| | | | |
|---|---|---|---|
| 4,403,297 A * | 9/1983 | Tivy | 702/122 |
| 5,436,555 A * | 7/1995 | Locke et al. | 324/66 |
| 6,259,258 B1 | 7/2001 | Cook | |
| 2004/0095921 A1 | 5/2004 | Kerpez | |

\* cited by examiner

*Primary Examiner*—Don N Vo
(74) *Attorney, Agent, or Firm*—Harness, Dickey & Pierce PLC

(57) ABSTRACT

A method for determining crosstalk coupling between a plurality of transmission lines in digital data transmission systems, in particular DSL networks. Firstly, at least one test signal (TS) is generated having a unique identification code (UIC) in the frequency domain (f), said code (UIC) being associated with a first transmission line. Then, the test signal (TS) is sent on the first transmission line. At least a second transmission line is monitored for detecting a crosstalk signal. It is determined whether the crosstalk signal is caused by the test signal (TS) of the first transmission line by means of a signature of the unique identification code (UIC) comprised in the crosstalk signal. In this way crosstalk between individual transmission lines can be determined without having to have recourse to conservative worst case assumptions. The method can adapt dynamically to a changing user/transmission environment, while obtaining unique crosstalk determination results at all times.

10 Claims, 3 Drawing Sheets

METHOD FOR DETERMING CROSSTALK COUPLING AND CROSSTALK DETERMINING UNIT FOR INTEGRATION IN DIGITAL DATA TRANSMISSION SYSTEMS

BACKGROUND OF THE INVENTION

The invention is based on a priority application EP 05291798.6 which is hereby incorporated by reference.

The invention relates to a method for determining crosstalk coupling between a plurality of transmission lines in digital data transmission systems, in particular DSL networks.

The invention also relates to a crosstalk determining unit for integration in or for connection to an access node of a digital data transmission system, in particular a DSL network, with a plurality of transmission lines coupled to the access node.

Furthermore, the invention relates to a digital data transmission system, in particular in the form of a DSL network, and to a computer program product for determining crosstalk coupling in digital data transmission systems, in particular DSL networks, with a plurality of transmission lines.

Crosstalk remains one of the major limiting factors for Digital Subscriber Lines (DSL) transmission, as it effectively limits the obtainable DSL bitrate (for a given loop length) or the DSL reach at a guaranteed minimum bitrate. Furthermore, crosstalk can cause errors in transmission, service interruption, and the need for time consuming re-initializations and re-synchronizations. As a consequence crosstalk plays a major role in DSL service deployment. Additionally, knowledge of crosstalk coupling is equally valuable for other DSL deployment scenarios, e.g. service upgrading, fault diagnosis, etc. For all DSL deployment phases (such as prequalification or in-service optimisation), solutions are needed that help to estimate the impact of crosstalk, or even to minimise it (such as dynamic spectrum management DSM). For instance, when DSL lines are limited by far-end crosstalk (FEXT), FEXT needs to be mitigated in order to upgrade DSL users to higher bit rates. Alternatively, for a given service FEXT mitigation can largely extend the reach of DSL. The same holds also for near-end crosstalk (NEXT).

An important issue in this context is to determine which transmission lines (hereinafter also referred to as "lines") are crosstalk-affecting one another. Typically a cable leaving a Digital Subscriber Line Access Multiplexer (DSLAM) contains thousands of lines. Crosstalk coupling is present between all line couples, but the crosstalk coupling is not equally strong for each line couple. Especially when lines inside a cable are grouped in binders, crosstalk coupling between lines in the same binder is on average higher than crosstalk between lines in separate binders. In order to optimise the performance of a DSL network and to limit its complexity, e.g. by means of DSM algorithms, an important point is to know which lines are contained in one binder. Although databases exist from which one may deduce which lines are in the same cable or cable binder, these databases are not always updated, so that their reliability is estimated to be between 60 and 80%. Furthermore, from field tests, it is well-known that there is a lot of variation of crosstalk coupling between line couples—up to 20 dB—which cannot be accurately determined solely on the basis of the mechanical design of the loop plant.

A first kind of prior art solutions for determining crosstalk levels rely on worst-case assumptions: Since the crosstalk coupling functions and the users that share the same binder are generally unknown, DSM algorithms have to resort to worst case crosstalk coupling functions, which are often overly conservative. An alternative prior art approach as described in European patent application 04 292 070.2 incorporated herein by reference includes Virtual Binder Identification through polling: This technique allows to detect which lines generate the highest amount of crosstalk towards a given transmission line of interest. It consists in continuously monitoring the on/off status and/or the noise margin of modems on different transmission lines. If a given modem is switched on and, as a consequence, a second modem switches off or experiences a loss in noise margin, the first modem/line can be identified as a dominant crosstalker with respect to the second modem/line. At the same time a crosstalk coupling constant can be estimated.

The aforementioned prior art approaches suffer from inherent disadvantages: For instance, the worst case assumption leads to overly conservative designs, wherein two users which share the same binder without affecting each other, will transmit with a "worst case" power spectral density (PSD), instead of transmitting at full power. Furthermore, the resulting spectrum management is static in nature and thus does not change when new users become active or when the loop topology is changed. Concerning Virtual Binder Identification through polling, polling the on/off status and/or the noise margin of each single line is highly complex and infeasible in practice since on/off switching of modems is controlled by the end user and not by the central agent. Hence, the agent would have to monitor all lines (at the same time) to see whether or not the status of a particular modem changes. A DSLAM, however, can only process a small number of simple network management protocol (SNMP) commands per minute, which limits the number of lines that can be monitored at a given time. Still another disadvantage concerns the uniqueness of the polling result: If two modems ("disturbers") switch on at essentially the same time, and two other modems ("victims") have to retrain or find their noise margin reduced as a result of this, it is impossible to determine which victim is affected by which disturber. Hence, the polling process of crosstalk detection is not unique, which may lead to incorrect spectrum management.

SUMMARY OF THE INVENTION

It is the object of the invention to provide a method of the above-mentioned type which obviates the aforementioned disadvantages of prior art solutions thus leading to crosstalk coupling determination which does not rely on conservative assumptions, which can adapt dynamically to a changing system environment, which can be used successfully in digital data transmission systems with a large number of lines, and which obtains unique results.

It is also an object of the invention to provide a crosstalk determining unit, a digital data transmission system, and a computer program product capable of transforming the inventive method into practise.

The object is achieved by means of a method for determining crosstalk coupling between a plurality of transmission lines in digital data transmission systems, in particular DSL networks, comprising the steps of: generating at least one test signal having a unique identification code in the frequency domain, said code being associated with a first transmission line; sending the test signal on the first transmission line; monitoring at least a second transmission line for detecting a crosstalk signal; and determining whether the crosstalk signal is caused by the test signal of the first transmission line by means of a signature of the unique identification code comprised in the crosstalk signal.

The object is also achieved by a crosstalk coupling determining unit for integration in or for connection to an access node of a digital data transmission system, in particular a DSL network, with a plurality of transmission lines coupled to the access node, comprising: unique identification code generating means for generating at least one unique identification code in the frequency domain, said code being associated with a first transmission line; means for providing the unique identification code to a management information database of the access node; information gathering means for gathering quantitative information indicative of crosstalk coupling from the management information database; and determination means for determining crosstalk coupling between the second transmission line and the first transmission line by means of a signature of the unique identification code comprised in said quantitative information.

Additionally, the object is achieved by a digital data transmission system, in particular in the form of a DSL network, comprising: an access node comprising a management information database including quantitative information indicative of a crosstalk coupling between any two of the transmission lines; a plurality of modems connected to the access node via transmission lines by means of conducting wire, where the access node is located in a central office (CO-fed) and/or in a remote terminal (RT-fed), and an inventive crosstalk coupling determining unit.

Finally, the object is achieved by means of a computer program product for determining crosstalk in digital data transmission systems, in particular DSL networks, with a plurality of transmission lines, being operable to perform the inventive method.

The basic idea of the invention consists in uniquely determining which lines are mutually coupling by sending a dedicated test signal having a unique identification code (e.g. identification tones). The crosstalk effect evoked by such a test signal is quite simple to monitor, such that no polling mechanism is required to detect when modems are switched on or off. In this way, the inventive approach is highly scalable, therefore monitoring of thousands of lines is possible at a reduced overall system complexity. Furthermore, by using a variety of identification codes one can uniquely identify the disturber, e.g. an RT modem. In the prior art, if two RT-fed lines at distinct RT disturbers switch on at the same time and two victims, e.g. CO-fed modems, fail simultanously, it would be impossible to determine which CO-line was affected by which RT-line/modem.

In a preferred embodiment of the inventive method the test signal is added to the power spectral density (PSD) of a normal transmission signal (transmit PSD) of the line under test. At the same time, the amount of crosstalk coupling in the other lines can be determined in parallel with normal signal transmission. This will be explained in more detail below.

According to the invention the crosstalk determining unit plays the role of a central agent, which is able to monitor thousands of DSL lines by means of SNMP commands and by using quantitative information gathered from a management information database (MIB) comprised in said access node (DSLAM). Each time the central agent wants to determine the influence of a presumed (or known) disturber line towards some victim lines, the disturber modem will be switched on to apply the coded test signal to that disturber line. In a first variant of the inventive method, in order to add such a code signal to a normal PSD, generation of the test signal comprises activating a number of tones located at predetermined frequencies within a transmission frequency spectrum, which are not being used for a normal transmission signal, wherein the number and/or location of the tones constitutes the unique identification code. E.g., assuming that an RT-deployed modem is transmitting only at the highest frequencies of the transmission frequency spectrum, then a small number of tones could advantageously be activated at the low frequencies of the transmission frequency spectrum. The positions and/or the number of these additional tones are chosen to be unique and determine a particular code. CO-connected users, which often experience major crosstalk from RT-connected users, can then be monitored by using corresponding quantitative information available in the MIB.

Advantageously, said quantitative information comprises at least one of bit loading and noise level on the second transmission line, and the determination means of the inventive crosstalk determining unit are adapted for determining the crosstalk coupling between the second transmission line and the first transmission line by detecting a signature of the unique identification code correspondingly in at least one of bit loading and quiet line noise (QLN) on the second transmission line. If the bit loading drops at the positions of the identification tones (or the noise increases at said positions), the central agent will know that the CO-fed user is a victim of that particular RT, which is uniquely identified by its associated test signal coding. Assigning unique codes to different modems, e.g. RTs, thus allows to perform the aforementioned procedure in parallel over multiple RTs, since they can be accurately distinguished due to their particular code.

According to a second variant of the inventive method generation of the test signal comprises deactivating a number of tones located at predetermined frequencies within a transmission frequency spectrum, wherein the number and/or location of the tones constitutes the unique identification code. This approach is complementary to the aforementioned technique: If an RT-deployed modem is using the entire transmission frequency band, it will preferably switch off a number of tones in order to incorporate coding information in its normal transmission signal. Again, the positions of the (deactivated) tones determine the code. An increase in bitrate or a decrease in quiet line noise would be detectable at the victim modems.

Alternatively, according to a third variant of the inventive method generation of the test signal comprises switching off all tones located on one side of a transmission frequency spectrum with respect to a dividing frequency and switching on all tones located on the other side of the transmission frequency spectrum with respect to the dividing frequency. In this particular embodiment the position of said dividing frequency or "split tone" serves as a unique code.

In a further highly preferred variant the inventive method comprises the further step of grouping the transmission lines which show crosstalk coupling to the first transmission line into a virtual binder of the first transmission line. In this way the method according to the invention can be used to determine which lines affect one another by crosstalk. Besides detecting disturber-victim relations, the presented technique also allows to measure the magnitude (strength) of the crosstalk over frequency, e.g. by taking into account the quantitative reduction in bit loading or the quantitative increase in quiet line noise (QLN) at a particular frequency, which is a property similar to virtual binder identification through polling (cf. prior art). Thus the inventive idea of virtual binder identification by adding coded information in the frequency domain can be regarded as dual of polling: Basically, virtual binder identification through polling is a technique that exploits time domain information, i.e. detecting a change in status from on to off at a particular moment in time for disturber modems and the associated drop in noise margin for the victim modems. The inventive method exploits information in the frequency domain, and therefore is not time critical. While polling all lines simultaneously is not feasible in practise, the idea of sending coded PSDs on the other hand achieves a low complexity implementation in current DSL networks. However, it is also possible to use said two approaches in conjunction, the inventive method being complemented by additionally determining the crosstalk between the first transmission line and at least one second transmission line by means of detecting a change in on/off status for a modem associated with the first transmission line and detecting a corresponding change in on/off status and/or noise margin for a modem associated with the second transmission line. In this way, crosstalk determination can become even more accurate, e.g. in a case where the insertion of an identification code in the frequency domain causes a victim modem to retrain. If this retrain is observed, it is clear that the modem was subjected to crosstalk from the disturber.

The inventive method as described above is applicable to all ADSL and VDSL flavours. Furthermore, the technique is standard compliant and falls within the constraints imposed by the MIB and the DSLAM.

Further advantages and characteristics of the present invention can be gathered from the following description of preferred embodiments with reference to the enclosed drawings. The features mentioned above as well as below can be used in accordance with the invention either individually or in conjunction. The embodiments mentioned are not to be understood as an exhaustive enumeration but rather as examples with regard to the underlying concept of the present invention.

BRIEF DESCRIPTION OF THE DRAWINGS

FIG. 1 shows a digital data transmission system in the form of a DSL access network 1 wherein several hundreds or thousands of DSL modems 2.1-2.3 are connected to an access multiplexer DSLAM 3, also referred to as a DSL central office (CO). To illustrate the working principle of the present invention, only three of those modems 2.1-2.3 are depicted for reasons of clarity. The modems 2.1-2.3 are coupled to the DSLAM 3 by means of twisted pair copper transmission lines 4.1-4.3. These lines 4.1-4.3 can form part of the same physical binder or can be comprised in different physical binders, which is not shown in FIG. 1. Alternatively, a number of said modems 2.1-2.3 could be RT-deployed modems coupled to a remotely deployed DSLAM.

Figure 1:
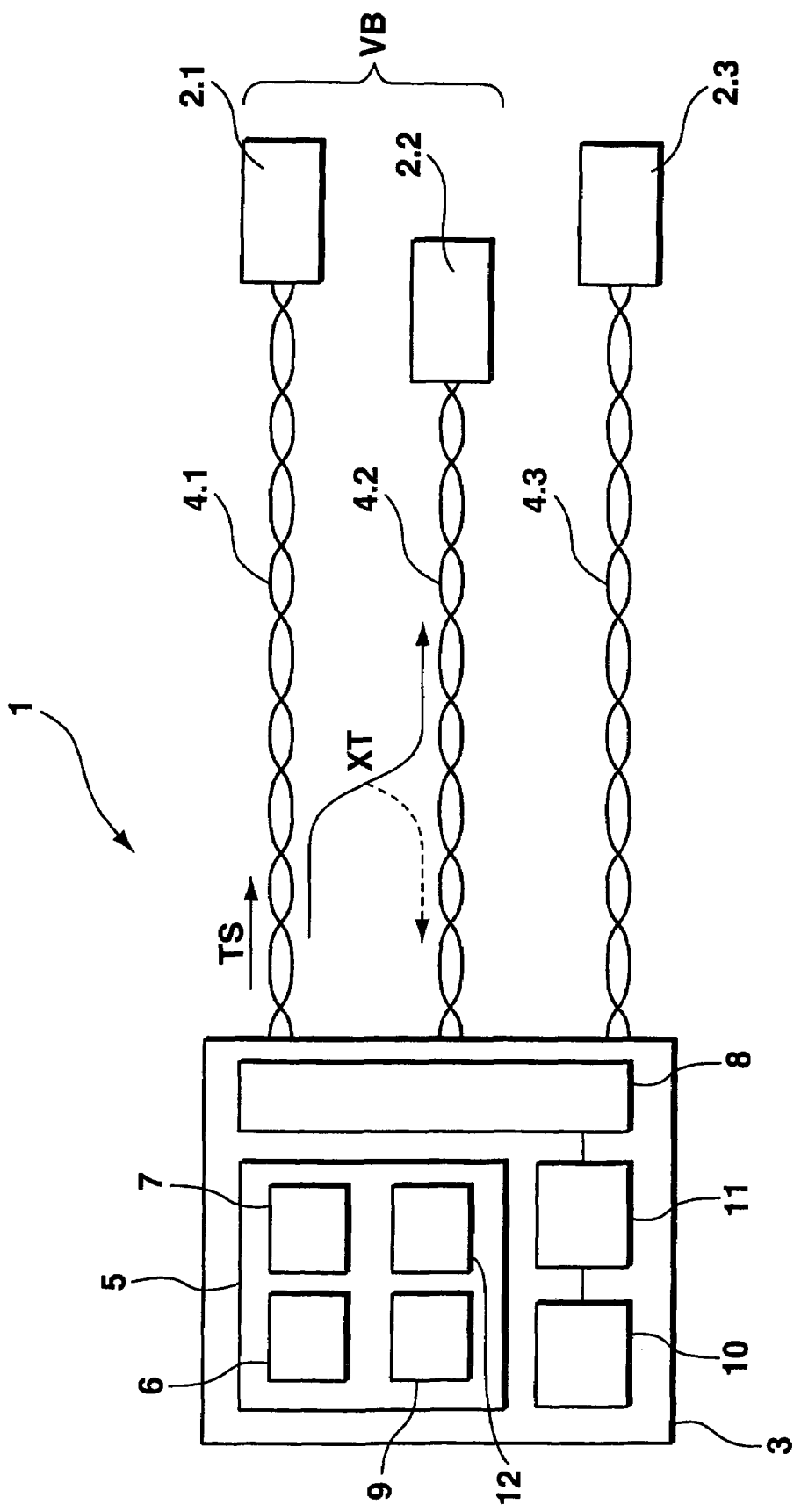
FIG. 1 is a schematic block diagram of a digital data transmission system according to the invention.

The access multiplexer DSLAM 3 in FIG. 1 incorporates a crosstalk determining unit 5 according to the current invention. Alternatively, it is possible to locate the crosstalk determining unit outside of the DSLAM 3, e.g. in a network analyzer.

The crosstalk determining unit 5 comprises unique identification code generation means 6 for generating at least one unique identification code UIC. The crosstalk determining unit 5 further comprises means 7 for providing the UIC to a management information database (MIB) 10 of the DSLAM 3. The UIC is embedded in the carrier mask, which is a parameter in the MIB 10 to configure transmission lines. Hence, the crosstalk determining unit 5 defines the carrier mask and writes it to the MIB 10. When one of the transmission lines 4.1 to 4.3 starts transmitting, it uses the configuration parameters from the MIB 10 to set its transmit PSD. This carrier masking can be set in down- and/or in upstream, e.g. by providing the carrier masks to the corresponding modems 2.1 to 2.3 by using a sending means 8 incorporated in the DSLAM 3. In this way, the carrier mask can also contain a normal transmit signal as well.

The crosstalk determining unit 5 is used in upstream and consequently, the first modem 2.1 generates and sends a test signal TS on the first transmission line 4.1 (when alternatively using the crosstalk determining unit 5 in downstream, it is the DSLAM 3 that generates and sends the test signal TS). In any case, the test signal TS has an unique identification code UIC in the frequency domain (cf. FIG. 2), said code being associated with the transmission line 4.1, hereinafter referred to as "first transmission line" 4.1. The modem 2.1 sends the test signal possibly together with a normal transmission signal NTS (cf. FIG. 2a).

Furthermore, the crosstalk coupling determining unit 5 comprises information gathering means 9 for gathering quantitative information indicative of a crosstalk coupling XT between the first transmission line 4.1 and at least one other of the transmission lines, hereinafter referred to as "second transmission line" 4.2. The information gathering means 9 are in operative connection with the management information database MIB 10 which includes quantitative information indicative of crosstalk coupling XT between any two of the transmission lines 4.1-4.3, e.g. quiet line noise and bit loading values (cf. FIG. 2), measured on the transmission lines by means of appropriate measuring means 11 also comprised in the access multiplexer DSLAM 3, so that victim lines connected to the same or to another DSLAM writes their impacted bit loading and/or quiet line noise into the MIB 10. Besides, the crosstalk determining unit 5 further comprises determination means 12 for determining the crosstalk coupling between the first transmission line 4.1 and the second transmission line 4.2 by means of a signature of the unique identification code UIC comprised in said quantitative information.

Figure 1A:
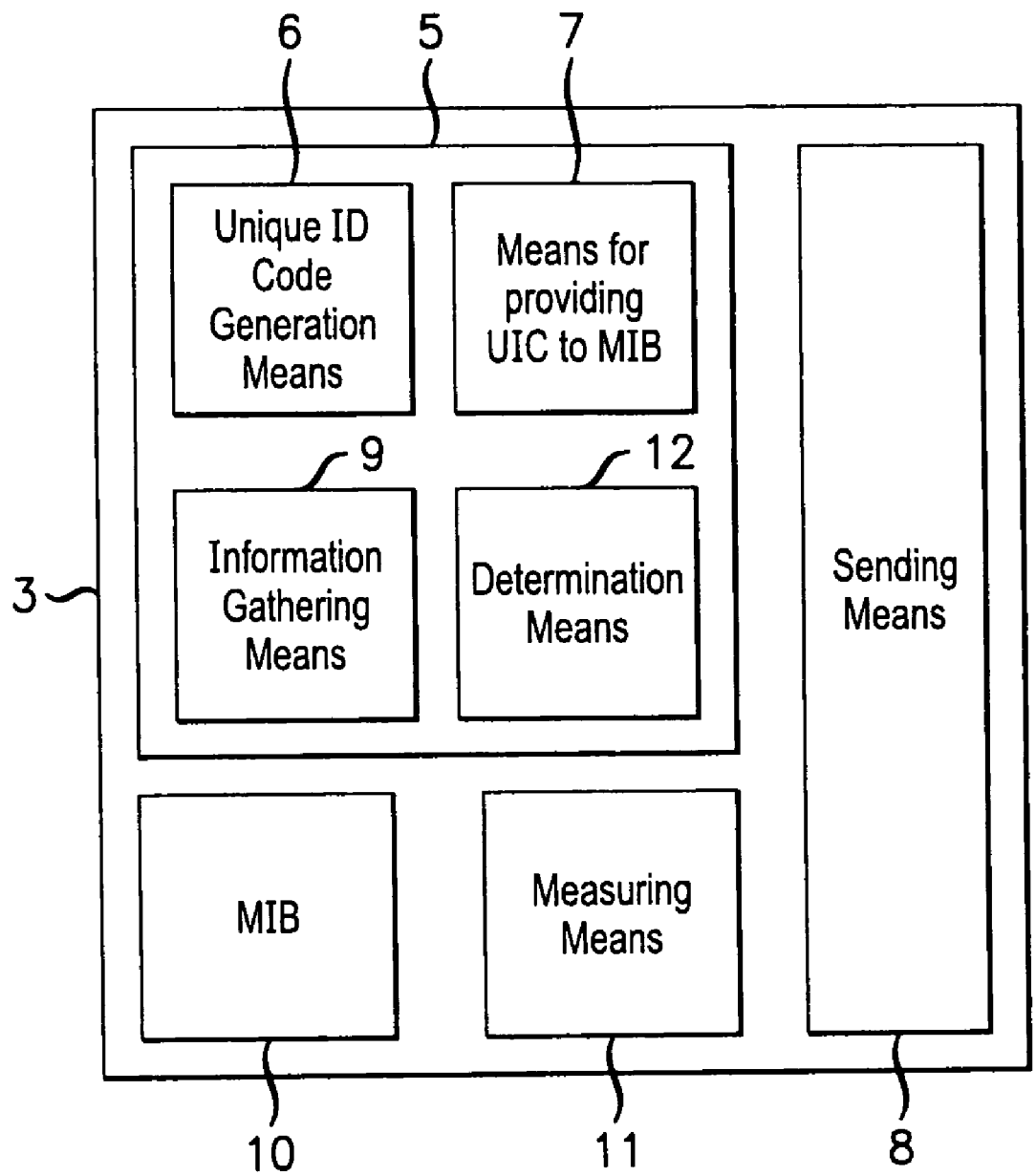
FIG. 1A is an exploded view of DSLAM 3 of FIG. 1.

FIG. 1A is an exploded view of the DSLAM 3 of FIG. 1.

In a preferred embodiment, at least the crosstalk coupling determining unit 5 is devised in software form and translated into practise by means of a corresponding computer program product as claimed, which is operable in connection with a suitable program execution means, e.g. a microprocessor with associated storage means (not shown), comprised in the access multiplexer DSLAM 3.

Figure 2A:
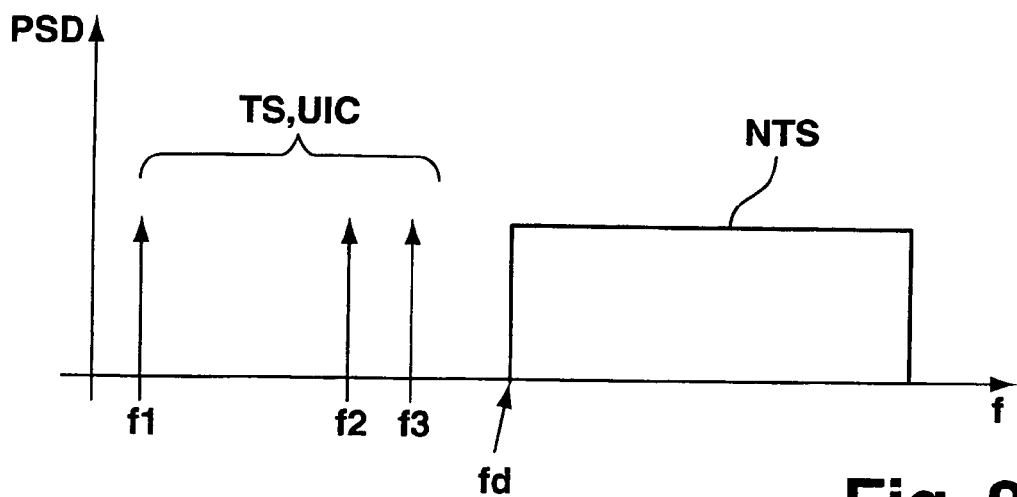
FIG. 2a-c are schematic diagrams illustrating the construction and use of unique identification codes according to the invention.

FIG. 2a is a diagram indicating a transmission signal strength (power spectral density PSD, in arbitrary units) on line 4.1 (FIG. 1) as a function of a transmission frequency f for transmission of a normal transmission signal NTS at higher frequencies with an added unique identification code UIC at lower frequencies in the frequency domain, e.g. in the case of an RT-deployed modem which is normally transmitting at the highest frequencies of the transmission frequency spectrum only. Said code UIC is uniquely associated with said first transmission line 4.1 and therefore comprises a unique combination of identification tones IT1-IT3, i.e. signal components at corresponding frequencies f1-f3 as illustrated by means of the vertical arrows in FIG. 2a, wherein said code can reside in the number of individual components (frequencies f1-f3) and/or the relative distribution of the individual components. The totality of the frequency contributions f1-f3 and NTS depicted in FIG. 2a is transmitted as a combined signal (test signal TS+normal transmission signal NTS) on the first transmission line 4.1, which crosstalks with the second transmission line 4.2, as depicted in FIG. 1 (arrow XT). Note however, that the method is not limited to far-end crosstalk detection, but could also be used for NEXT, represented by the dashed part of the arrow XT ending at the end of transmission line 4.2 with the DSLAM 3. It should also be emphasized that the method described above is not limited to three identification tones, but the number of tones may be chosen in an appropriate way depending on specifications of the transmission system 1 (number of transmission lines etc.).

Figure 2B:
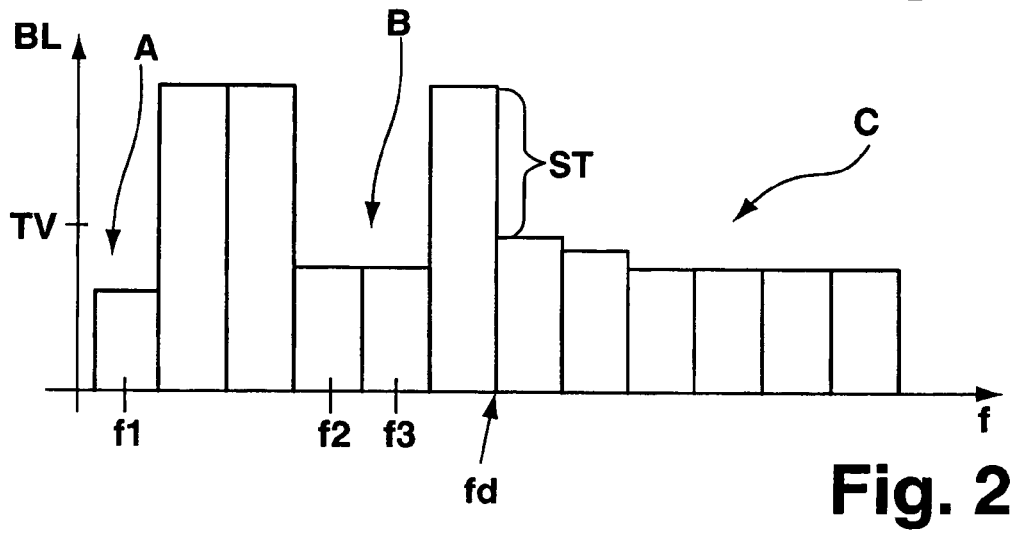

FIG. 2b is a diagram indicating the bit loading BL (in number of bits per subcarrier) on transmission line 4.2 (FIG. 1) as a function of frequency f. In areas marked A, B bits have been lost at frequency positions that correspond to the identification tones IT1-IT3 sent on the first line 4.1 (cf. FIG. 2a). The loss of bits at or around a particular frequency is detected by comparison of the corresponding bit loading value BL with a predetermined threshold value TV. Thus, a particular frequency, e.g. f1, is found to be "affected" if the bit loading at that particular frequency is measured to lie below said threshold value TV. Correspondingly, an increase in quiet line noise at frequencies f1-f3 could be measured in the case in which no transmission occurs on the second line 4.2, wherein a rise of said noise value above a corresponding threshold value TV would be indicative of crosstalk affection.

Figure 2C:
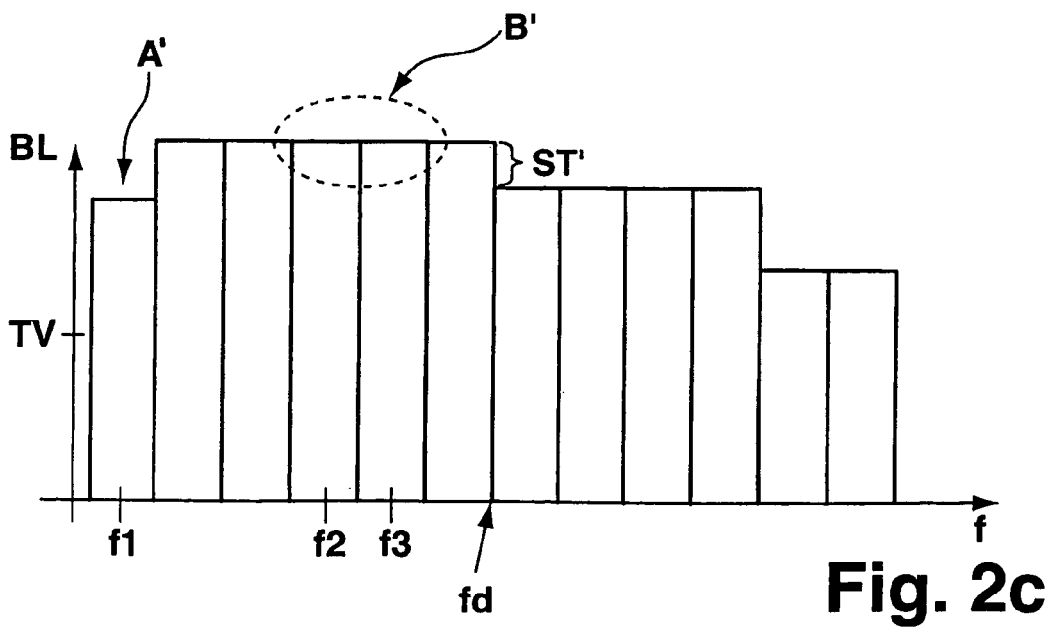

Thus, from quantitative information concerning the bit loading of the second transmission line 4.2 gathered from the MIB 10 (FIG. 1) the crosstalk determining unit 5 is able to determine the disturber modem 2.1/line 4.1 which is crosstalk affecting said line 4.2 by means of its unique identification code UIC, which has left a "bit-loss signature" in the bit loading spectrum of said line 4.2. It should be noted that the decrease in bit loading with respect to an undisturbed line 4.2, which is present in an area marked C in FIG. 2b and which is also due to crosstalk from the first line 4.1, would not be sufficient to detect the disturber-victim relation between the first and second lines 4.1, 4.2 in the frequency domain and in a unique way. However, this information—together with the simultaneously occurring bit loading decreases in areas A, B—can be used in the time domain to additionally determine said disturber-victim relation, as disclosed in European patent application 04 292 070.2. FIG. 2c is a diagram indicating the bit loading BL (in number of bits per subcarrier) on the third transmission line 4.3 (FIG. 1) as a function of frequency f. In areas marked A', B' which correspond to the areas marked A, B in FIG. 2b, no bits have been lost at frequency positions corresponding to the identification tones IT1-IT3 sent on the first line 4.1 (cf. FIG. 2a). Therefore, the third line 4.3 is found to be essentially unaffected by crosstalk from the first line 4.1.

In the present example the identification tones thus reveal by their signature left in quantitative information data of said second line 4.2 that it belongs to a virtual binder VB (FIG. 1) of the first line 4.1, whereas the third line 4.3 does not. It is therefore possible to group the transmission lines 4.1 to 4.3 of the system 1 into virtual binders each of which contains only transmission lines with a high crosstalk correlation among themselves and with a low crosstalk correlation to the transmission lines of the other virtual binders. The distinction between high and low crosstalk correlations is done by using the threshold value as described above.

For modems 2.1-2.3 (FIG. 1) using the entire frequency spectrum for transmission, the identification tones IT1-IT3 in FIG. 2a preferably correspond to signal gaps rather than signal peaks at certain predetermined frequencies f1-f3. Correspondingly, the associated code would translate into corresponding bit loading values which lie above the threshold value TV as indicated in FIG. 2b, while all other bit loading values, i.e. at frequencies f≠f1, f2, f3, would be potentially affected and thus lie below said threshold value TV.

Alternatively, the location of a dividing frequency fd (cf. FIGS. 2a-c) or split tone can serve as a unique identification code UIC in scenarios in which no dedicated identification tones IT1-IT3 are sent on the first transmission line 4.1. Said dividing frequency fd corresponds to a (lower) limiting frequency for normal transmission on said first transmission line 4.1. Its signature can be detected on an affected transmission line, i.e. the second transmission line 4.2, if a corresponding step ST in bit loading (cf. FIG. 2b) is greater than another corresponding threshold value. Thus, as a corresponding step ST' is too small in FIG. 2c, again no crosstalk would be detected for transmission lines 4.1 and 4.3.

In this way crosstalk between individual transmission lines can be determined without having recourse to conservative worst case assumptions. The inventive method, unit, and system described above can adapt dynamically to a changing user/transmission environment, while obtaining unique crosstalk coupling determination results at all times.

The invention claimed is:

1. Method for determining crosstalk coupling between a plurality of transmission lines in digital data transmission systems, in particular DSL networks, comprising the steps of:
    generating at least one test signal having a unique identification code in the frequency domain, said code being associated with a first transmission line, wherein the unique identification code includes a unique combination of identification tones;
    sending the test signal on the first transmission line;
    monitoring at least a second transmission line for detecting a crosstalk signal;
    determining whether the crosstalk signal is caused by the test signal of the first transmission line by means of a signature of the unique identification code in the crosstalk signal.

2. Method according to claim 1, wherein the test signal is added to the power spectral density of a normal transmission signal.

3. Method according to claim 1, wherein generation of the test signal comprises activating a number of tones located at predetermined frequencies of a transmission frequency spectrum which are not being used for a normal transmission signal, wherein a number and/or location of the tones constitutes the unique identification code.

4. Method according to claim 1, wherein generation of the test signal comprises deactivating a number of tones located at predetermined frequencies within a transmission frequency spectrum, wherein a number and/or location of the tones constitutes the unique identification code.

5. Method according to claim 1, wherein generation of the test signal comprises switching off all tones located on one side of a transmission frequency spectrum with respect to a dividing frequency and switching on all tones located on the other side of the transmission frequency spectrum with respect to the dividing frequency.

6. Method according to claim 1, wherein the further step of grouping the transmission lines which show crosstalk coupling to the first transmission line into a virtual binder of the first transmission line.

7. Crosstalk determining unit for integration in or for connection to an access node of a digital data transmission system, in particular a DSL network, with a plurality of transmission lines coupled to the access node, comprising:
    unique identification code generating means for generating at least one unique identification code in the frequency domain, said code being associated with a first transmission line, wherein the unique identification code includes a unique combination of identification tones;

means for providing the unique identification code to a management information database of the access node;

information gathering means for gathering quantitative information indicative of crosstalk coupling from the management information database; and determination means for determining crosstalk coupling between a second transmission line and the first transmission line by means of a signature of the unique identification code comprised in said quantitative information.

8. Crosstalk determining unit according to claim 7, wherein said quantitative information comprises at least one of bit loading and noise level on the second transmission line and that the determination means are adapted for determining the crosstalk coupling between the first transmission line and the second transmission line by detecting a signature of the unique identification code correspondingly in at least one of bit loading and quiet line noise on the second transmission line.

9. A digital data transmission system, comprising:
the crosstalk determining unit according to claim 7;
wherein the quantitative information gathered by the information gathering means is indicative of a strength of crosstalk coupling between any two of the transmission lines; and
a plurality of modems connected to the access node via the first and second transmission lines by means of conducting wire or wireless technology.

10. Computer program product for determining crosstalk coupling in digital data transmission systems, in particular DSL networks, with a plurality of transmission lines, being operable to perform the method according to claim 1.

* * * * *